(12) United States Patent
Doyle et al.

(10) Patent No.: US 10,187,148 B2
(45) Date of Patent: *Jan. 22, 2019

(54) CONNECTING A HIGH NUMBER OF USERS WITH A REDUCED NUMBER OF OPTICAL FIBERS

(71) Applicant: PRYSMIAN S.p.A., Milan (IT)

(72) Inventors: Daniel James Doyle, Milan (IT); Richard Earnest Beattie, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/510,816

(22) PCT Filed: Sep. 16, 2014

(86) PCT No.: PCT/EP2014/069714
§ 371 (c)(1),
(2) Date: Mar. 13, 2017

(87) PCT Pub. No.: WO2016/041582
PCT Pub. Date: Mar. 24, 2016

(65) Prior Publication Data
US 2017/0257164 A1    Sep. 7, 2017

(51) Int. Cl.
*G02B 6/44* (2006.01)
*H04B 10/25* (2013.01)
(Continued)

(52) U.S. Cl.
CPC ..... *H04B 10/2504* (2013.01); *G02B 6/02395* (2013.01); *G02B 6/4432* (2013.01); *H04B 10/27* (2013.01); *H04B 10/272* (2013.01)

(58) Field of Classification Search
CPC ........ G02B 6/443; G02B 6/4494; G02B 6/44; G02B 6/4433; G02B 6/4429; G02B 6/4471
See application file for complete search history.

(56) References Cited

U.S. PATENT DOCUMENTS

| 6,215,930 B1 * | 4/2001 | Estes | G02B 6/4475 |
| | | | 385/100 |
| 8,249,450 B2 * | 8/2012 | Conner | G02B 6/4452 |
| | | | 398/141 |

(Continued)

FOREIGN PATENT DOCUMENTS

| EP | 2 353 233 | 8/2011 |
| WO | 2010/044975 A1 | 4/2010 |

OTHER PUBLICATIONS

International Search Report and Written Opinion dated May 6, 2015 in PCT/EP2014/069714 filed Sep. 16, 2014.

(Continued)

*Primary Examiner* — Jennifer Doan
(74) *Attorney, Agent, or Firm* — Oblon, McClelland, Maier & Neustadt, L.L.P.

(57) ABSTRACT

A method for connecting a number of users with at least one signal bearing optical fiber ($110_{1+z}$; $210_{1+5}$) contained in an optical cable (105; 205) is proposed. The method comprises the following steps: a) interrupting said signal bearing optical fiber ($110_{1+z}$; $210_{1+5}$) at a first branch point ($115_{x|1}$; $215p_{1+5}$), obtaining a first optical fiber segment ($110_{x|1}$; $210i_{1+5}$) upstream of said branch point ($115_{x|1}$; $215p_{1+5}$) and a second optical fiber segment ($110_{x|2}$) downstream of said branch point ($115_{x|1}$; $215p_{1+5}$); b) providing an optical splitter ($120_{x|1}$; $220p_{1+5}$) at the branch point ($115_{x|1}$; $215p_{1+5}$), the optical splitter ($120_{x|1}$; $220p_{1+5}$) comprising an input and two outputs; c) coupling the first optical fiber segment ($110_{x|1}$; $210i_{1+5}$) with the input of the optical splitter ($120_{x|1}$; $220p_{1+5}$); d) coupling a first output of the optical splitter ($120_{x|1}$; $220p_{1+5}$) with a first user; e) coupling a second output of the optical splitter ($120_{x|1}$; $220p_{1+5}$) with a downstream optical fiber segment ($110_{x|1}$; $210_{6+8|1+5}$) of an interrupted optical fiber ($110_x$; $210_{6+8}$) contained in the optical cable (105; 205), and f) coupling said downstream (Continued)

optical fiber segment ($110_{x|1}$; $210_{6+8|1+5}$) with at least one further user at a further branch point ($215s_{1+5|a+c}$) downstream said first branch point ($115_{x|1}$; $215p_{1+5}$).

13 Claims, 2 Drawing Sheets

(51) Int. Cl.
*H04B 10/272* (2013.01)
*G02B 6/02* (2006.01)
*H04B 10/27* (2013.01)

(56) References Cited

U.S. PATENT DOCUMENTS

| | | |
|---|---|---|
| 2008/0112675 A1* | 5/2008 | Lewallen ............ G02B 6/4454 385/99 |
| 2010/0092129 A1 | 4/2010 | Conner |
| 2010/0092133 A1 | 4/2010 | Conner |
| 2010/0092146 A1 | 4/2010 | Conner et al. |
| 2010/0092169 A1 | 4/2010 | Conner et al. |
| 2010/0092171 A1 | 4/2010 | Conner |
| 2014/0254986 A1 | 9/2014 | Kmit et al. |

OTHER PUBLICATIONS

Singaporean Office Action dated Feb. 1, 2018 in Singaporean Patent Application No. 11201701391X.

\* cited by examiner

CONNECTING A HIGH NUMBER OF USERS WITH A REDUCED NUMBER OF OPTICAL FIBERS

BACKGROUND OF THE INVENTION

Field of the Invention

The present invention relates to an optical network arrangement for connecting a plurality of users, even in relatively high number, with a reduced number of optical fibers, and particularly to the deployment of cables for the connection of users to optical networks.

Overview of the Related Art

The deployment of broadband telecommunications networks calls for using optical fibers for the so-called "last mile", i.e. the last trunk of the telecommunications network to which network termination devices, like for instance modems, network termination units (NTU) or, set-top boxes for receiving cable television services are directly connected. User devices such as computers, IP (Internet Protocol) phones and similar devices connect to the broadband telecommunications network via the network termination device.

Typically, the deployment of the last mile of an optical telecommunication network provides for the lay in the field of optical cables containing a plurality of optical fibers, for instance in a number variable from 6 to 48. The cables are routed through conduits that can for example develop through or along the walls of a multi-floor building, often for more or less vertical segments, or, in the case of separate buildings set in succession along a city street, the optical cables extend horizontally through conduits preferably located under of the ground level.

Typically, an optical cable of the type adapted for this use includes a tubular element, or sheath, inside which several optical fibers are placed. Depending on the specific type of application, the optical fibers can be accommodated within the sheath without protections, or they may be covered by a protective coating, or they may also be gathered in independent groups (also referred to as microcables or micromodules) contained in a thin tubular coating.

In order to make the connection of the different users to the optical network, it is necessary to lead one or more optical fibers to the sites (apartments, houses, offices) of the users. To this end, openings need to be made in the sheath of the optical cables, so as to be able to access the optical fibers accommodated within each cable. Through such openings, the optical fibers can be at least partially drawn out, extracted from the cable and routed where needed, for example to sockets provided for in the premises of the users, to which the respective users can be connected.

An example of such deployment is provided by WO 2009/113112 in the name of the same present Applicant, wherein optical fiber units contained in an optical cable are connected to users by means of the phases of: providing an opening in a sheath of the optical cable to access the optical fiber units contained in the optical cable; extracting a segment of at least one optical fiber unit from the optical cable through the opening; inserting a free end of the extracted segment of optical fiber unit into a protection tube; making the protection tube slide on the extracted segment of optical fiber unit to insert an end portion of the protection tube, distal from the free end of the extract segment of the optical fiber unit, into the optical cable through the opening; positioning a closure element on the optical cable in correspondence of the opening so as to substantially realize a closure thereof; securing in removable way the closure element to the optical cable and bringing the free end of the extracted segment of optical fiber unit in correspondence of a connection point of a user device.

Another type of deployment for connecting different users is disclosed, for example, in WO 2006/13655, wherein an optical cable is disclosed containing several optical microcables where two openings in the external sheath are made: a first opening in correspondence of the point at which the cabling for the connection of a subscriber has to be realized, and a second opening downstream thereof, at a distance of the order of about some meters or tens of meters from the first opening. One of the optical microcables contained in the optical cable is selected (for example based on its color) and cut in correspondence of the second opening, and the segment of microcable between the first opening and the point of cut is then extracted from the optical cable through the first opening. The extracted microcable segment is then inserted into a pre-installed microconduit that extends to the connection point of the subscriber, or, depending on the circumstance, to a branch box.

Finally, US 2008/0240662 discloses a duplicated use of optical fibers in an optical cable. The optical cable comprises a main optical fiber module and a secondary optical fiber module. Optical fibers of the main optical fiber module are sectioned, at one end, and connected to optical fibers of the secondary optical fiber module in order to form a connection loop.

SUMMARY OF THE INVENTION

It often happens that the optical cable has to be passed through conduits already existing in buildings or other infrastructures, originally intended to contain other types of cables, for instance for the distribution of electric energy and/or of television and/or telephone signals and/or other optical fiber cables. This is for example the case where optical fibers have to be deployed in buildings or beneath infrastructures built in relatively remote past times. It also often happens that the optical cable has to be passed through conduits located under ground level along streets and roads, and these conduits may already be occupied with existing other cables. Therefore, a very limited space may be available for the lay of optical cables to the extent that the number of optical fibers comprised in the optical cable which can be laid could not suffice for coupling of all the users to be connected with the optical network.

In view of the above, the Applicant has observed that known prior art deployment systems and methods do not provide a satisfying solution adapted to allow utilization of congested ducts, that would otherwise not support conventional realizations for maximizing the fiber efficiency of an optical network.

The Applicant has found that it is possible, in the same cable, taking out an optical fiber through which an optical signal propagates, interrupting said optical fiber in a point of the cable, splitting the optical signal of such interrupted optical fiber into split optical signals at said point, as required to connect a user, and, downstream of the interruption, continuing to propagate at least some of the split optical signals to further users, by injecting such some split optical signals into the same optical fiber after the interruption thereof, or/and, if available, into further interrupted optical fibers of the cable, thereby achieving the result of connecting a high number of users with a reduced number of optical fibers.

The present invention relates to a method for connecting users, even in relatively high number, with an optical fiber contained in an optical cable, comprising the steps of interrupting the optical fiber at a branch point obtaining a first corresponding optical fiber segment upstream of said branch point and a second corresponding optical fiber segment downstream of said branch point; providing an optical splitter at the branch point which comprises an input and at least two outputs; coupling the first corresponding optical fiber segment to the input of the optical splitter provided at the branch point; coupling a first output of the optical splitter with at least one user; coupling the second output of the optical splitter at the branch point to the second corresponding optical fiber segment or to a further optical fiber segment of a further interrupted optical fiber.

In one embodiment of the invention, said downstream optical fiber of an interrupted optical fiber is said second optical fiber segment.

In one embodiment of the invention, said downstream optical fiber segment of an interrupted optical fiber is an optical fiber segment of a further idle optical fiber.

In one embodiment of the invention, said optical splitter comprises m outputs and said optical cable comprises m−2 idle fibers or segments.

In one embodiment of the invention, the users are at least two users and the step of coupling a first output of the optical splitter with a user comprises: providing at the branch point a cascaded optical splitter comprising an input and at least two outputs; coupling the first output of the optical splitter with the input of the cascaded optical splitter, and coupling each one of the at least two outputs of the cascaded optical splitter with a respective one of the at least two users.

In one embodiment of the invention, the at least one further user comprises at least two users and wherein the step of coupling said downstream optical fiber segment with at least one further user at a further branch point downstream said first branch point, comprises: coupling the downstream optical fiber segment with a further cascaded optical splitter comprising an input and at least two outputs, and coupling each one of the at least two outputs of the further cascaded optical splitter with a respective one of the at least two users.

In one embodiment of the invention, the method further comprises the step of coupling the first optical fiber segment at one end thereof with a network element for propagating one or more optical signals from/to the network element to/from the user and/or the further user.

In one embodiment of the invention, the method further comprises the following steps: interrupting the second optical fiber segment at the further branch point; providing a further optical splitter at the further branch point, the further optical splitter comprising an input and at least two outputs coupling the second optical fiber segment with the input of the further optical splitter provided at the further branch point, and coupling one of the at least two outputs of the further optical splitter with the input of the further cascaded optical splitter.

In one embodiment of the invention, the method further comprises repeating steps coupling said downstream optical fiber segment with at least one further user at a further branch point downstream said first branch point; interrupting the second optical fiber segment at the further branch point; providing a further optical splitter at the further branch point, the further optical splitter comprising an input and at least two outputs coupling the second optical fiber segment with the input of the further optical splitter provided at the further branch point, and coupling one of the at least two outputs of the further optical splitter with the input of the further cascaded optical splitter in correspondence of at least one subsequent branch point downstream said further branch point.

In one embodiment of the invention, step of coupling a second output of the optical splitter with a downstream optical fiber segment of an interrupted optical fiber contained in the optical cable comprises interrupting the interrupted optical fiber at the branch point obtaining the optical fiber segment of the interrupted optical fiber downstream of said branch point, and further interrupting the optical fiber segment at the at least one further branch point.

BRIEF DESCRIPTION OF THE DRAWINGS

These and others features and advantages of the solution according to the present invention will be better understood by reading the following detailed description of an embodiment thereof, to be read in conjunction with the attached drawings, wherein.

DETAILED DESCRIPTION OF THE INVENTION

Figure 1:
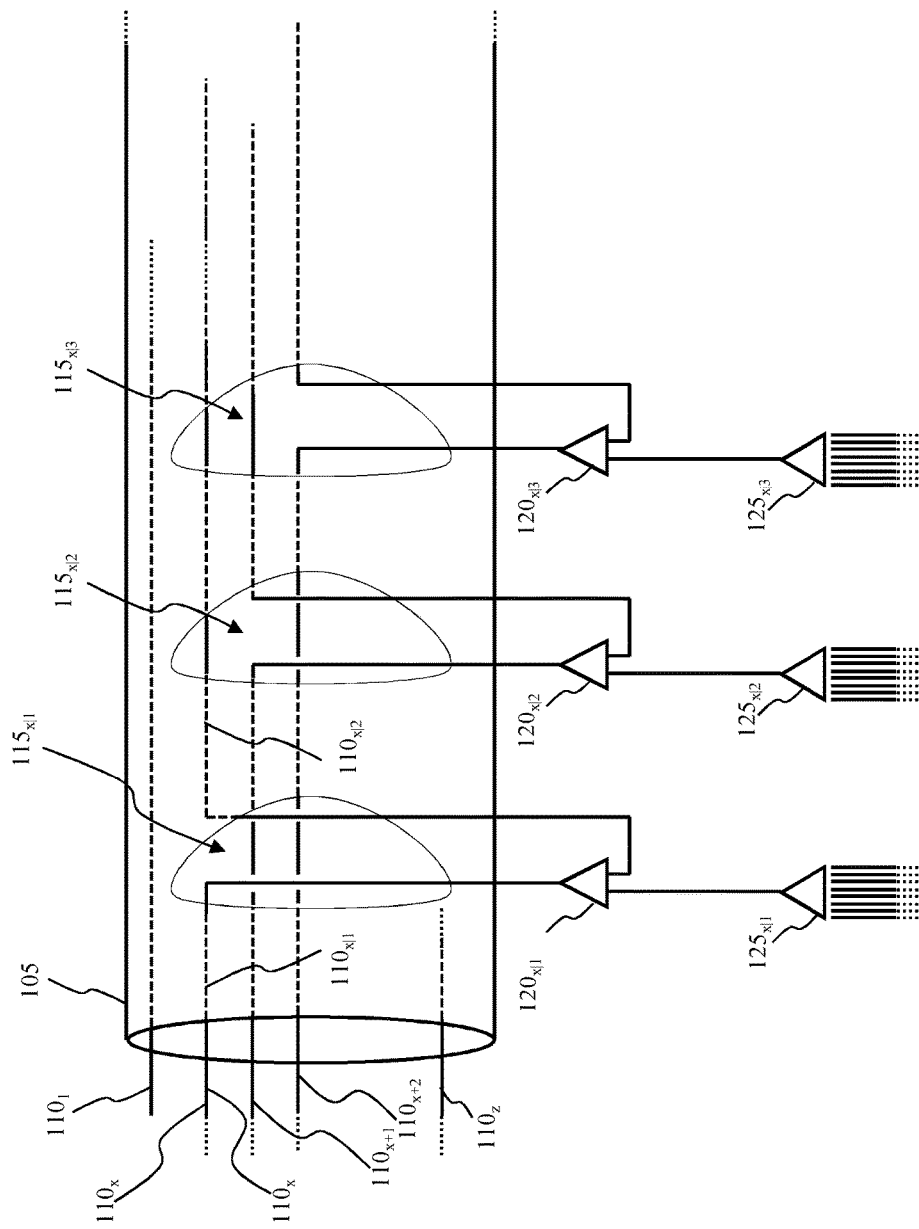
FIG. 1 is a schematic diagram of optical fibers deployment according to an embodiment of the present invention.

For the purposes of the present description and claims an optical cable is deemed to be an optical cable comprising one or more optical fibers, possibly arranged inside one or more buffer tubes, an outer sheath and, optionally, one or more strength members.

An optical fiber is typically constituted by an optical waveguide, constituted by an optically transmissive core, surrounded by a cladding; core and cladding are preferably constituted by silica-based material, and the material of the cladding has a refraction index lower than the refraction index of the material of the core, for substantially confining the optical radiation within the core. The optical waveguide is preferably covered by at least one protective coating layer ("coating"); typically two protective coating layers are present: the first coating layer ("primary coating") is in direct contact with the optical waveguide, while the second coating layer ("secondary coating") covers the primary coating. In addition, a buffer layer may cover each optical fiber, the buffer layer may be substantially in contact with the secondary coating ("tight buffer") or it may consist of a small tube of inner diameter somehow larger than the outer diameter of the secondary coating ("loose buffer"). The coating layers may be colored by means of suitable inks for an easier identification of the different optical fibers accommodated within the optical cable.

The optical fibers may be arranged in various ways in the cable.

In the so-called "central loose tube cables" (briefly, CLT cables), the optical fibers are loosely arranged within a single buffer tube, which is in turn enclosed by the external sheath.

In the so-called "multi loose tube cables" (briefly, MLT cables), the optical fibers are grouped in multiple bundles, the optical fibers of each bundle being loosely arranged within a respective buffer tube. Typically, the buffer tubes may be arranged around a central strength member and stranded according to a closed or open helix (S-Z arrangement).

Further, a so-called "blown fiber tube cables" (briefly, BLT cables), similarly to the MLT cables, comprises a plurality of buffer tubes stranded together (or arranged around a central strength member) according to a closed or open helix (S-Z arrangement). The buffer tubes are designed to receive single optical fibers (or bundles of optical fibers) blown inside the buffer tubes.

Both in CLT cables and in MLT cables, the external sheath may comprise strength members (typically made of steel or fiber reinforced resin) embedded within the sheath's thickness and placed at diametrically opposed positions. Moreover, or alternatively, the optical fibers or buffer tubes may be surrounded by flexible strength members arranged radially externally of the optical fibers. Flexible strength members may comprise aramid yarns or the like.

The term "user" is to be herein construed as meaning any generic user (or device of a user) connectable to the telecommunication network. User devices may comprise for example modems, set-top boxes for cable TV (for instance IPTV—Internet Protocol TeleVision), IP phones and similar devices.

The term "signal bearing optical fiber" is to be herein construed as meaning an optical fiber contained in the optical cable and coupled, either directly or indirectly, with a network element, e.g. an Optical Line Terminal or OLT able to bear the optical signal from the Optical Line Terminal to a user, so that optical signals are transmitted along such fiber.

The term "idle optical fiber" is to be herein construed as meaning an optical fiber, contained in the optical cable, and not directly or indirectly coupled to the Optical Line Terminal, such that no optical signals are transmitted along such fiber.

With reference to the embodiment shown in the example of FIG. 1 of the present invention, a single optical cable 105 (even though embodiments of the present invention many be applied to microcables or micromodules included in an optical cable) comprising at least one optical fibers $110_1$, preferably a plurality of optical fibers $110_1$ to $110_z$ (where z≥1, for example z=8), is used for propagating one or more optical signals along a "last mile" of a telecommunication network (i.e., a so-called "Fiber To The x", FTTx, architecture, such as for example a "Fiber To The Premises", FTTP, architecture) to a certain number of users (e.g., users in a same building and/or in buildings facing a same street and/or in buildings standing in a same block etc.).

As known, a size of the optical cable 105 depends on the number of optical fibers $110_1$ to $110_z$ which are accommodated therein.

In the optical fibers network (for example a Gigabit Passive Optical Network, or GPON) of the embodiment depicted in the example of FIG. 1, at least one optical fiber $110_x$ (which has to be considered the signal bearing optical fiber coupled, either directly or indirectly, with a network element) in the optical cable 105 is interrupted, or segregated in the jargon, at a first (primary) branch point $115_{x|1}$ along the cable (the first branch point $115_{x|1}$ is schematized by a rectangle in FIG. 1), wherein the first branch point $115_{x|1}$ is provided for connecting a certain number of respective user (not shown) located in a same area (e.g., a floor of a building or a whole building) to the telecommunication network.

Preferably, the optical cable 105 sheath is cut, for example by making a window or opening therein, in order to expose the optical fibers $110_1$ to $110_z$ contained therein.

The segregation of the optical fiber $110_x$ at the first branch point $115_{x|1}$ allows obtaining an optical fiber portion (hereinafter referred to as first optical fiber segment) $110_{x|1}$ upstream the first branch point $115_{x|1}$ and a remaining optical fiber portion (from which at least a second optical fiber segment $110_{x|2}$ may be obtained, as described in the following) downstream the first branch point $115_{x|1}$ (possible uses of the remaining optical fiber portion downstream the first branch point $115_{x|1}$ will be described shortly hereafter).

At the first branch point $115_{x|1}$, a first main optical splitter $120_{x|1}$ is provided (being a 1:2 optical splitter in the example of FIG. 1). The first main optical splitter $120_{x|1}$ comprises one input and two outputs (other examples may be 1:4, 1:8, 1:16, 1:32 etc. optical splitters).

The input of the first main optical splitter $120_{x|1}$ is coupled with the first optical fiber segment $110_{x|1}$.

Preferably, one output of the first main optical splitter $120_{x|1}$ (in the exemplary case the first main optical splitter $120_{x|1}$ is a 1:2; at least one output of the first main optical splitter in case the latter has more than two outputs, being e.g. a 1:4, or a 1:8, etc., optical splitter) is coupled to an input of a first cascaded optical splitter $125_{x|1}$ (for example a 1:8 optical splitter in the example of FIG. 1, which has one input and eight outputs (other examples are 1:2, 1:4, 1:16, 1:32 etc. optical splitters). The outputs of the first cascaded optical splitter $125_{x|1}$ are then coupled to the (eight in the example of FIG. 1) user devices located in the same area mentioned above.

By "cascaded optical splitter" it is meant an optical splitter arranged downstream an optical splitter (such as the main optical splitter $120_{x|1}$), i.e. having its input fiber connected to an output fiber of a preceding optical splitter.

In this way, optical signals transmitted (e.g., by the OLT) into the first optical fiber segment $110_{x|1}$ and propagating through it towards the first main optical splitter $120_{x|1}$ at the first branch point $115_{x|1}$ are split (e.g., replicated in a passive optical network) at each of the (two, in the considered example) outputs of the first main optical splitter $120_{x|1}$ into (two) corresponding split optical signals. One of the (two) split optical signals outputted by the first main optical splitter $120_{x|1}$ (first split optical signal) is further split into corresponding (eight in the considered example) optical signals by the first cascaded optical splitter $125_{x|1}$. Each one of the further split optical signals is provided to a respective user device.

In another embodiment of the invention (not shown), said one output of the first main optical splitter $120_x$, instead of being coupled to the input of the first cascaded optical splitter $125_{x|1}$, may be (directly) coupled to a respective user device which receives the first split optical signal outputted by the first main optical splitter $120_{x|1}$.

Advantageously, the remaining output of the first main optical splitter $120_{x|1}$ (at which a second split optical signal is made available) is expediently connected to the remaining optical fiber portion of the optical fiber $110_x$ downstream the first branch point $115_{x|1}$, thereby the remaining optical fiber portion of the optical fiber $110_x$ downstream the first branch point $115_{x|1}$ is not left unused, being instead advantageously re-used to distribute optical signals to further users. The remaining optical fiber portion of the optical fiber $110_x$ can be either the signal bearing optical fiber or the idle optical fiber.

In a further embodiment of the present invention, the remaining output of the first main optical splitter $120_{x|1}$ is connected to an optical fiber segment of another interrupted optical fiber (for example, a segment of a further idle optical fiber).

Preferably, in order to increase the number of users that can be served by means of one of the optical fibers of the optical cable, one or more further branch points (not shown at a certain distance from the branch point $115_{x|1}$) similar to the branch point $115_{x|1}$ are provided along the optical cable 105, wherein at each of said further branch points the remaining optical fiber portion of the optical fiber $110_x$ downstream the first branch point $115_{x|1}$ is further segregated and coupled to users.

Other optical fibers $110_1$ to $110_z$ contained in the cable 105, such as the optical fibers $110_{x+1}$, $110_{x+2}$, in the example of FIG. 1, can be treated like the optical fiber $110_x$, at respective branch points $115_{x|2}$ and $115_{x|3}$, with respective optical splitters $120_{x|2}$ and $120_{x|3}$.

Advantageously, the structure just described may be iterated for a number of optical splitters comprising m outputs and wherein the optical cable 105 comprises at least m−2 idle fibers (or idle fiber segments).

Preferably, a generic n-th optical fiber segment is coupled, at one end thereof, with a second output of a (n−1)-th main optical splitter of a previous (n−1)-th branch point and the other end of the n-th optical fiber segment is coupled to an input of a n-th main optical splitter of a n-th branch point.

Therefore, any optical signals transmitted (e.g., by the OLT) through the first optical fiber segment $110_{x|1}$ and propagating through it is split at the branch point $115_{x|1}$ (by a corresponding main optical splitter $120_{x|1}$) into respective first and second split optical signals at the outputs of the respective main optical splitter $120_{x|1}$. The first split optical signal is provided to the users coupled with a first output of the respective main optical splitter $120_{x|1}$. The second split optical signal is propagated to a respective next branch point through a respective segment obtained by segregating the remaining optical fiber portion of the generic optical fiber $110_x$. The same applies for the optical fibers $110_1$ to $110_z$ contained in the cable 105, such as the optical fibers $110_{x+1}$, $110_{x+2}$, in the example of FIG. 1.

Preferably, in correspondence of each branch point, a branch box, or tapping box, is provided. The tapping box (not shown in detail) substantially comprises a box-shaped enclosure, e.g. of generically rectangular or square shape, comprising an opening provided with a closure cover, attachable or hinged to the box-shaped enclosure. The tapping box contains the main optical splitter and the cascaded optical splitter provided at each branch point, as well as optical fiber connector(s).

The invention embodiment described up to now allows connecting a relatively high number of users by exploiting even just one of the optical fibers of an optical cable.

Figure 2:
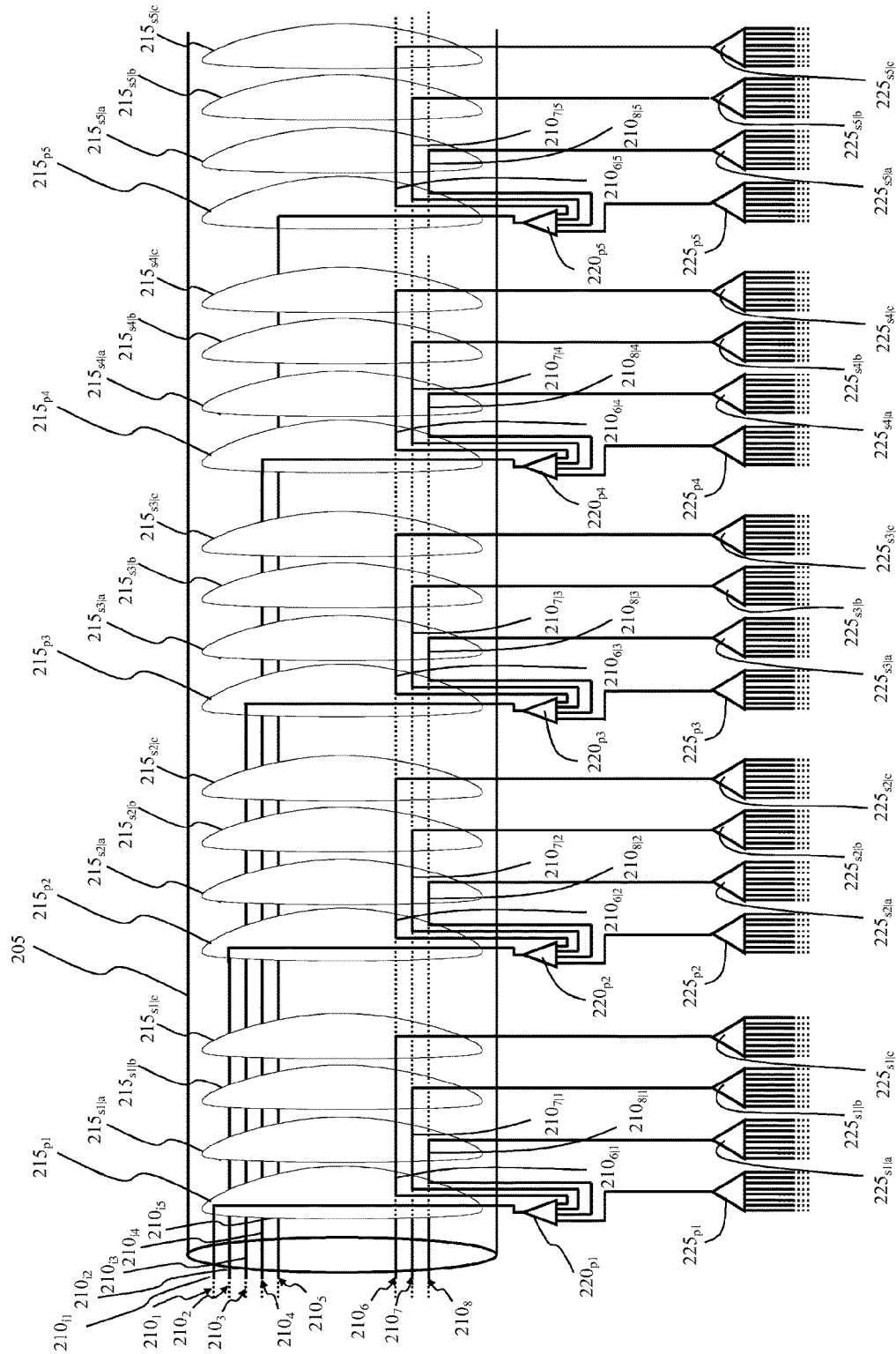
FIG. 2 is a schematic diagram of optical fibers deployment according to another embodiment of the present invention.

Turning now to FIG. 2, it is represented an example of a schematic diagram of an optical fibers deployment according to another embodiment of the present invention.

The optical fibers deployment of FIG. 2 differs from the optical fibers deployment previously described essentially in what follows (wherein similar elements are denoted by similar numeral references).

In one exemplary implementation, only a first subset of optical fibers $210_{1+x}$ of the overall optical fibers $210_{1+z}$ contained in an optical cable 205 are coupled (either directly or indirectly) at one of their ends to the OLT (or other equivalent network element). Indicating with z the overall number of optical fibers contained in the optical cable 205, and with x the number of optical fibers in the first subset, it is 1≤x<z (in the example of FIG. 2 it is z=8 and x=5). The first subset of optical fibers comprises the optical fibers from $210_1$ to $210_5$. Conversely, a second subset of optical fibers $210_{(x+1)+z}$ contained in the optical cable 205, comprising three optical fibers $210_6$ to $210_8$ in the example of FIG. 2, are segregated at one or more branch points along the cable, so as to obtain idle optical fiber segments that are exploited for propagating split optical signals to users, as described in the following.

Preferably, the first subset of the optical fibers from $210_1$ to $210_5$ comprises signal bearing optical fibers, whilst the second subset of optical fibers from $210_6$ to $210_8$ comprises idle optical fibers.

In the example depicted in FIG. 2, each optical fiber $210_1$ to $210_x$ of the first subset (i.e., those which are coupled to the OLT) is interrupted, or segregated, at a respective primary branch point $215p_1$ to $215p_x$ (schematized by a rectangle in FIG. 2), provided for connecting a certain number of respective users (not shown) located in a same area (e.g., a floor of a building or a whole building or several buildings along a street or in an area) to the telecommunication network. The segregation of the fibers $210_1$ to $210_x$ of the first subset at the respective primary branch points $215p_1$ to $215p_x$ allows obtaining, for each of the fibers $210_1$ to $210_x$, a respective first optical fiber segment $210i_1$ to $210i_x$, respectively, upstream the respective primary branch point $215p_1$ to $215p_x$, which respective first optical fiber segment $210i_1$ to $210i_x$ is connected with the OLT, and a respective remaining optical fiber portion downstream the respective primary branch point $215p_1$ to $215p_x$.

Advantageously, the structure just described may be iterated for a number of optical splitters comprising m outputs and wherein the optical cable 105 comprises at least m−2 idle fibers (or idle fiber segments). In the scheme of FIG. 2 three idle optical fibers have been depicted (namely the optical fibers $210_6$, $210_7$, $210_8$), in connection with 1×4 optical splitters 220. By using the downstream segment of the optical fiber $210_{i1}$, (which has become an idle fiber downstream the cut) the number of idle fibers to be provided in the cable can be diminished down to the minimum corresponding to m−2 (where m is the number of outputs of the splitters 220, or the number of outputs of the largest of the splitters 220 in case they have different output numbers).

Each primary branch point $215p_{1+x}$ comprises a main optical splitter $220p_{1+x}$, being a 1:4 optical splitter in the example of FIG. 2 which has one input and four outputs (other examples are 1:2, 1:8, 1:16, 1:32 etc. optical splitters). The input of each one of the main optical splitters $220p_{1+x}$ is coupled with a respective one of the optical fiber segments $210_{1+x}$ of the first subset of optical fibers.

Considering the generic primary branch point $215p_1$ to $215p_x$, at least one output of the corresponding main optical splitter $220p_{1+x}$ is coupled to an input of a respective primary cascaded optical splitter $225p_{1+x}$, a 1:8 optical splitter in the example of FIG. 2 having one input and eight outputs (other examples for the primary cascaded optical splitter are 1:2, 1:4, 1:16, 1:32 etc. optical splitters). The outputs of the primary cascaded optical splitter $225p_{1+x}$ are then coupled to the (eight in the example of FIG. 2) users located in the same area mentioned above.

In this way, optical signals transmitted (e.g., by the OLT) into a generic one of the first optical fiber segments $210i_1$ to $210i_x$, and propagating through to the respective main optical splitter $220p_{1+x}$ are split at each of the (e.g., four) outputs thereof into (four) corresponding split optical signals. One of the (four) split optical signals outputted by the main optical splitter $220p_{1+x}$ is further split into corresponding (eight, in the example) further split optical signals by the primary cascaded optical splitter $225p_{1+x}$. Each one of the further split optical signal is provided to a respective user device.

As for the embodiment of FIG. 1, said at least one output of the main optical splitters $220p_{1+x}$, instead of being coupled to the input of the primary cascaded optical splitter, may be (directly) coupled to a respective user device which receives the split optical signal outputted by the main optical splitter $220p_{1+x}$.

The remaining outputs of the generic main optical splitter $220p_{1+x}$ of the generic primary branch point $215p_1$ to $215p_x$ are expediently coupled each one to a respective segment $210_{(x+1)|1+x}$ to $210_{z|1+x}$ of one of the optical fibers $210_{(x+1)+z}$ of the second subset, to reach further, secondary branch points $215s_{1|a+c}$ to $215s_{x|a+c}$. For example, as shown in FIG. 2, outputs of the main optical splitter $220p_1$ are coupled to optical fiber segments $210_{6|1}$, $210_{7|1}$ and $210_{8|1}$ of the optical fibers $210_{6+8}$ of the second subset, to reach secondary branch points $215s_{1|a}$, $215s_{1|b}$ and $215s_{1|c}$, and a similar configuration is adopted for the other main optical splitters $220p_{2+5}$ at the subsequent primary branch points $215p_{2+5}$.

The generic optical fiber segments $210_{(x+1)|1+x}$ to $210_{z|1+x}$, of the optical fibers $210_{(x+1)}$ to $210_z$ of the second subset are obtained by segregating the corresponding optical fiber $210_{(x+1)+z}$ at the primary branch points $215p_{1+x}$ and in correspondence of a respective one of the secondary branch points $215s_{1|a+c}$ to $215s_{x|a+c}$. For example, as shown in FIG. 2, the segments $210_{6|1+5}$ are obtained by segregating the optical fiber $210_6$ at each one primary branch point $215p_{6|1+5}$ and in correspondence of each (first) secondary branch point $215s_{1|c+5|c}$, the segments $210_{7|1+5}$ are obtained by segregating the optical fiber $210_7$ at each primary branch point $215p_{1+5}$ and in correspondence of each (second) secondary branch point $215s_{1|b+5|b}$, and the segments $210_{8|1+5}$ are obtained by segregating the optical fiber $210_8$ at each primary branch point $215p_{1+5}$ and in correspondence of each (third) secondary branch point $215s_{1|a+5|a}$.

Each optical fiber segment $210_{(x+1)|1+x}$ to $210_{z|1+x}$ is coupled to a respective output of the main optical splitters $220p_{1+x}$ of the primary branch points $215p_{1+x}$ at which the corresponding optical fiber $210_{(x+1)+z}$ has been segregated. In this way, optical signals injected (e.g., by the OLT) into a generic one of the first optical fiber segments $210i_1$ to $210i_x$, and propagating through it in downlink to the respective main optical splitter $220p_{1+x}$ are split at each of the (e.g. four) outputs thereof into (four) corresponding split optical signals. Three of the (four) split optical signals outputted by the main optical splitter $220p_{1+x}$ are propagated from respective outputs of the intermediate optical splitters $220p_{1+x}$ to the respective secondary branch points $215s_{1|a+c}$ to $215s_{x|a+c}$ through the optical fiber segment $210_{(x+1)|1+x}$ to $210_{z|1+x}$.

Preferably, at each secondary branch point $215s_{1|a+c}$ to $215s_{x|a+c}$ the respective optical fiber segment $210_{(x+1)|1+x}$ to $210_{z|1+x}$ of the optical fibers $210_{(x+1)+z}$ is inputted to a secondary cascaded optical splitter $225s_{1|a+c}$ to $225s_{x|a+c}$, a 1:8 optical splitter in the example of FIG. 2 having one input and eight outputs (other examples for the primary cascaded optical splitter are 1:2, 1:4, 1:16, 1:32 etc. optical splitters). The outputs of the secondary cascaded optical splitters $225s_{1|a+c}$ to $225s_{x|a}$ are then coupled to the (eight in the example of FIG. 2) respective users located in different areas (e.g., a different floor of a building, or a different building) than the area mentioned above with respect to the primary cascaded optical splitter $225p_{1+x}$.

As for the embodiment of FIG. 1, said respective outputs of the main optical splitters $220p_{1+x}$, to which the optical fiber segment $210_{(x+1)|1+x}$ to $210_{z|1+x}$ are coupled, instead of being coupled to the input of a respective secondary cascaded optical splitter, may be (directly) coupled to a respective user device located at the secondary branch point $215s_{1|a+c}$ to $215s_{x|a+c}$ which receives the respective split optical signal outputted by the main optical splitter $220p_{1+x}$ propagating through the respective optical fiber segment $210_{(x+1)|1+x}$ to $210_{z|1+x}$ of the optical fibers $210_{(x+1)+z}$.

The embodiment of FIG. 2 allows connection to a relatively high number of users with a very limited number of optical fibers $210_{1+z}$ (instead of e.g. using respective optical fibers for connecting the OLT with each one of the respective primary branch points $215p_1$ to $215p_x$ and respective optical fibers for connecting the OLT with each one of secondary branch points $215s_{1|a+c}$ to $215s_{x|a+c}$) of the optical cable 205, thus enabling the use of an optical cable with less fibers requiring a very limited physical space for the deployment of the optical cable 205.

Indeed, any optical signals transmitted (e.g., by the OLT) into a respective first optical fiber segment $210i_1$ to $210i_x$, of the first subset of optical fibers may be propagated to a number of secondary branch points $215s_{1+x|a+c}$ equal to a number y=z−x of the optical fibers $210_{(x+1)+z}$ of the second subset of optical fibers (y=3 in the example of FIG. 2). Therefore, any optical signals transmitted (e.g., by the OLT) into a respective first optical fiber segment $210i_1$ to $210i_x$, of the first subset of optical fibers may be propagated to a total of T=x×(y+1) branch points $215p_{1+x}$ and $215s_{1|a+c}$ to $215s_{x|a+c}$ (where T=5×(3+1)=20 in the example of FIG. 2). Definitively, any optical signals injected (e.g., by the OLT) into a respective first optical fiber segment $210i_1$ to $210i_x$, of the first subset of optical fibers may be propagated to a number of users equal to the sum of the outputs of the cascaded optical splitters $225p_{1+x}$ and $225s_{1|a+c}$ to $225s_{x|a+c}$ of each one of the T branch points $215p_{1+x}$ and $215s_{1|a+c}$ to $215s_{x|a+c}$—i.e. a total of 20×8=160 users may be connected to the telecommunication network by means of a single optical cable 205 in the example of FIG. 2 in which all the end optical splitters $225p_{1+x}$ and $225s_{1|a+c}$ to $225s_{x|a+c}$ are 1:8 optical splitters.

The optical cable 205 comprising eight optical fiber $210_{1+8}$ shown in FIG. 2 is an example of implementation of an embodiment of the present invention. Indeed, in other embodiments according to the present invention (not shown) optical cables comprising a different number of optical fibers may be used. Similarly, in other embodiments according to the present invention (not shown) the primary and secondary branch points may comprise different main and cascaded optical splitters (in terms of split ratio). The optical splitters may have different number of outputs one from the other in order to be connected to a different number of secondary branch points and/or of users to be served (according to implementation requirements, e.g. a different number of users have to be served each branch point).

It should be noted that, due to the subdivision of the optical fibers $210_{1+z}$ into a first subset of optical fibers $210_{1+x}$ and in a second subset of optical fibers $210_{(x+1)+z}$ together with the different coloration of the optical fibers $210_{1+z}$, the deployment of the optical cable 105 is faster and less prone to errors.

As for the embodiment of FIG. 1, preferably, in correspondence of each branch point, a branch box, or tapping box, is provided. The tapping box (not shown in detail) substantially comprises a box-shaped enclosure, e.g. of generically cylindrical, rectangular or square shape, comprising an opening provided with a closure cover, attachable or hinged to the box-shaped enclosure. The tapping box contains the main optical splitter and can contain also the cascaded optical splitter provided at said branch point, as well as optical fiber connector.

The invention claimed is:

1. A method for connecting a plurality of users with at least one signal bearing optical fiber contained in an optical cable, the method comprising:
   a) interrupting said signal bearing optical fiber at a first branch point, obtaining a first optical fiber segment upstream of said branch point and a second optical fiber segment downstream of said branch point;
   b) providing an optical splitter at the branch point, the optical splitter comprising an input and at least two outputs;
   c) coupling the first optical fiber segment, which is upstream of said branch point, with the input of the optical splitter;
   d) coupling a first output of the optical splitter with at least one user outside of the optical cable;
   e) coupling a second output of the optical splitter with a downstream optical fiber segment of an interrupted optical fiber contained inside of the optical cable; and
   f) coupling said downstream optical fiber segment with at least one further user at a further branch point downstream said first branch point.

2. The method according to claim 1, in which said downstream optical fiber segment of an interrupted optical fiber is said second optical fiber segment.

3. The method according to claim 1, in which said downstream optical fiber segment of an interrupted optical fiber is an optical fiber segment of a further idle optical fiber.

4. The method according to claim 3, in which said optical splitter comprises m outputs and said optical cable comprises m−2 idle fibers or segments.

5. The method according to claim 1,
   wherein the at least one user comprises at least two users, and
   wherein the d) coupling of the first output of the optical splitter with at least one user is with respect to the at least two users and comprises:
      providing at the branch point a cascaded optical splitter comprising an input and at least two outputs,
      coupling the first output of the optical splitter with the input of the cascaded optical splitter, and
      coupling each one of the at least two outputs of the cascaded optical splitter with a respective one of the at least two users.

6. The method according to claim 1,
   wherein the at least one further user comprises at least two further users, and
   wherein the f) coupling of said downstream optical fiber segment with at least one further user at a further branch point downstream said first branch point is with respect to the at least two further users and comprises:
      coupling the downstream optical fiber segment with a further cascaded optical splitter comprising an input and at least two outputs, and
      coupling each one of the at least two outputs of the further cascaded optical splitter with a respective one of the at least two further users.

7. The method according to claim 1, further comprising:
   g) coupling the first optical fiber segment at one end thereof with a network element configured to propagate one or more optical signals from/to the network element to/from the at least one user and/or the at least one further user.

8. The method according to claim 6, further comprising:
   h) interrupting the second optical fiber segment at the further branch point;
   i) providing a further optical splitter at the further branch point, the further optical splitter comprising an input and at least two outputs;
   j) coupling the second optical fiber segment with the input of the further optical splitter provided at the further branch point; and
   k) coupling one of the at least two outputs of the further optical splitter with the input of the further cascaded optical splitter.

9. The method of claim 8, further comprising repeating f), h), i), j), k) in correspondence of at least one subsequent branch point downstream said further branch point.

10. The method according to claim 3, wherein the e) coupling of a second output of the optical splitter with a downstream optical fiber segment of an interrupted optical fiber contained in the optical cable comprises:
    interrupting the interrupted optical fiber at the branch point obtaining the optical fiber segment of the interrupted optical fiber downstream of said branch point, and
    further interrupting the optical fiber segment at the at least one further branch point.

11. The method according to claim 1, wherein the optical splitter is outside of the optical cable.

12. The method according to claim 1, further comprising:
    providing at the branch point a cascaded optical splitter comprising an input and more than two outputs;
    coupling the first output of the optical splitter with an input of the cascaded optical splitter; and
    coupling one of the more than two outputs of the cascaded optical splitter with the at least one user,
    wherein the optical splitter has less outputs than does the cascaded optical splitter.

13. The method according to claim 12, wherein the cascaded optical splitter is outside of the optical cable.

* * * * *